(12) United States Patent
Ulmer et al.

(10) Patent No.: US 7,095,234 B2
(45) Date of Patent: Aug. 22, 2006

(54) DEVICE FOR TRIGGERING IGNITION CIRCUITS

(75) Inventors: Michael Ulmer, Moessingen (DE); Andreas Rupp, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/520,560

(22) PCT Filed: Feb. 25, 2003

(86) PCT No.: PCT/DE03/00587

§ 371 (c)(1),
(2), (4) Date: Jul. 20, 2005

(87) PCT Pub. No.: WO2004/016475

PCT Pub. Date: Feb. 26, 2004

(65) Prior Publication Data

US 2006/0055412 A1   Mar. 16, 2006

(30) Foreign Application Priority Data

Jul. 17, 2002  (DE) .............................. 102 32 359

(51) Int. Cl.
*F02P 17/00* (2006.01)
(52) U.S. Cl. ........................... 324/380; 324/378
(58) Field of Classification Search ............... 324/380, 324/378; 123/618
See application file for complete search history.

(56) References Cited

U.S. PATENT DOCUMENTS 5,410,253 A * 4/1995 Evans et al. ................. 324/391
6,696,840 B1 * 2/2004 Ulmer ......................... 324/380
2002/0050826 A1   5/2002 Boran et al.

FOREIGN PATENT DOCUMENTS

DE      101 09 620       6/2002

* cited by examiner

*Primary Examiner*—Walter Benson
(74) *Attorney, Agent, or Firm*—Kenyon & Kenyon LLP

(57) ABSTRACT

A device for triggering ignition circuits is provided, a coupling being provided between a positive output stage and negative output stage of different pairs. Each positive and each negative output stage is assigned a diagnostic unit and a drive circuit.

4 Claims, 1 Drawing Sheet

DEVICE FOR TRIGGERING IGNITION CIRCUITS

FIELD OF THE INVENTION

The present invention relates to a device for triggering ignition circuits.

BACKGROUND INFORMATION

German Patent Document No. 101 09 620.8 describes a device for triggering ignition circuits, where a positive and negative output stage of, in each instance, different substrates are used for an ignition circuit.

SUMMARY

The device of the present invention for triggering ignition circuits provides the advantage over the prior art in that the present device is more cost-effective, since the cross-coupled, positive and negative output stages are now situated on a single substrate. In this context, the modularity of the set-up is also considerably increased. A gain in reliability is achieved, which is more significant than that of the known design approaches not having the cross coupling of the present invention, because the positive and negative output stages, along with their corresponding ignition-circuit diagnostics and triggering, may be implemented independently of each other.

It is advantageous that the geometric distance between the positive and negative output stages of the same ignition circuit on the substrate is maximized. In this manner, the reliability is increased, since as long a distance as possible between the positive and negative output stages for the same ignition circuit produces a high degree of independence from manufacturing tolerances, which may be localized on a portion of the substrate.

In addition, it is advantageous that a pair of positive and negative output stages may have the same power supply. This produces a considerable circuit-engineering advantage and simplifies the design.

DETAILED DESCRIPTION

Figure 1:
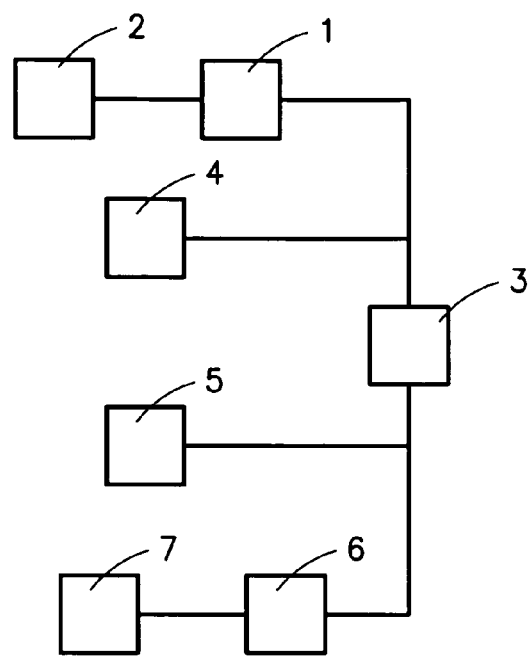
FIG. 1 shows a block diagram of a pair of positive and negative output stages according to the present invention.

FIG. 1 shows a block diagram of a pair of positive and negative output stages according to the present invention. A drive circuit 2 is connected to a positive output stage 1. Positive output stage 1 is connected to a firing pellet 3 (ignition circuit) and a diagnostic unit 4 via its other output. On the other side, firing pellet 3 is connected to a diagnostic unit 5 and a negative output stage 6. Negative output stage 6 is triggered, in turn, by a drive circuit 7.

Therefore, the ignition system is formed by positive output stage 1, firing pellet 3, and negative output stage 6. Added to this are diagnostic units 4 and 5, as well as drive circuits 2 and 7. Firing pellet or ignition circuit 3 is powered by the positive and negative output stages, which are switched through in the case of firing, in order to provide the ignition circuit with the ignition current. The positive output stage is referred to as such, since the supply voltage is connected to it, while the negative output stage is connected to ground. A separate drive circuit for positive and negative output stages 1 and 6 ensures that the positive and negative output stages of a pair may be cross-coupled to other positive and negative output stages of other pairs, in order to power a firing pellet. In this case, the positive and negative output stages of a pair have a common power supply. As an alternative, separate power supplies are also possible.

Figure 2:
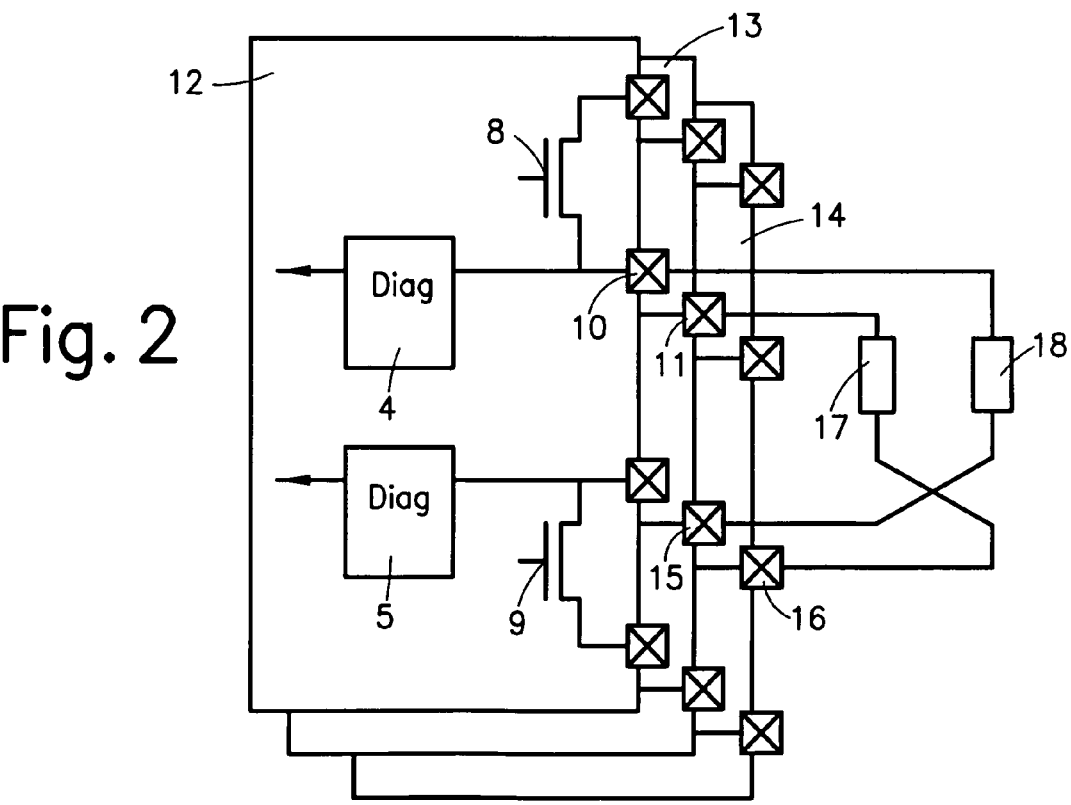
FIG. 2 shows a block diagram of an example embodiment of the device according to the present invention.

FIG. 2 shows an example embodiment of the device of the present invention in a block diagram. A pair of positive and negative output stages is situated in a block 12. Other pairs blocks 13 and 14 are schematically represented underneath block 12, i.e., blocks 13 and 14 are covered by block 12 in FIG. 2. The positive output stage is formed by a positive output-stage transistor 8, which is connected via a terminal 10 to a firing pellet 18, whose other output is connected to terminal 15, which in turn belongs to a negative output stage that is situated in a different pair. This is pair 13. Also connected to terminal 10 is a diagnostic unit 4, which belongs to positive output-stage transistor 8. Here, a negative output-stage transistor 9 of pair 12 is not connected to a firing pellet. However, it is possible to connect it to such a firing pellet, which is connected to a different positive output-stage transistor of another pair, in order to achieve cross coupling. Negative output-stage transistor 9 has its own diagnostic unit 5 at its terminal. A further firing pellet 17 is connected to a positive output-stage transistor of pair 13 via terminal 11. On its other side, firing pellet 17 is connected to a terminal 16 of pair 14, in order to be connected here to the negative output stage of pair 14. The diagnostic blocks assigned to the positive and negative output-stage transistors are connected to terminals 11, 15, and 16.

The base or the gate of transistors 8 and 9, and of the transistors of pairs blocks 13 and 14 that are covered by block 12 in FIG. 2, is activated by a processor, in order to appropriately switch these transistors through. Transistors 8 and 9, as well as the covered ones of blocks 13 and 14, are switched through, in order to trigger firing pellets 17 and 18 in case restraining devices should be activated. In the normal case, i.e., when firing pellets 17 and 18 should not be triggered, diagnostic units 4 and 5, as well as the covered diagnostic units of pairs blocks 13 and 14, carry out diagnostic measurements of firing pellets 17 and 18. In this context, firing pellets 17 and 18 are measured for resistances that are too large or too small. The resistances are measured, using voltages that decrease on the basis of diagnostic currents at firing pellets 17 and 18. If the voltages at firing pellets 17 and 18 exceed specified values, then firing pellets 17 and 18 are behaving erratically, and the stable functioning of firing pellets 17 and 18 is endangered, and therefore the use of the restraining devices, as well. In some instances, this then results in a warning or the switching-off of the restraining devices.

Drive circuits 2 and 7 are driver circuits, which are activated by the processor in the case of triggering. Therefore, drive circuits 2 and 7 are connected to the gate or the base of transistors 8 and 9.

What is claimed is:

1. A device for triggering at least two ignition circuits, comprising:
   a positive output stage assigned to each one of the two ignition circuits;
   a negative output stage assigned to each one of the two ignition circuits;
   a drive circuit assigned to each one of the positive output stages and negative output stages; and a diagnostic unit assigned to each one of the positive output stages and negative output stages;

wherein a first pair of positive output stage and a negative output stage is provided on a common substrate, and wherein a second pair of positive output stage and a negative output stage is provided on the common substrate, and wherein, for each ignition circuit, a positive output stage and a negative output stage from different pairs are provided.

2. The device as recited in claim 1, wherein for each pair of the positive output stage and the negative output stage, a common power supply is connected to the positive output stage and the negative output stage.

3. The device as recited in claim 2, wherein the common substrate is a single substrate.

4. The device as recited in claim 3, wherein one of a base and gate of transistors of the different pairs is configured to be activated by a processor to switch the transistors through in order to trigger a firing of pellets for activating.

* * * * *